(12) United States Patent
Raucheisen et al.

(10) Patent No.: US 11,834,540 B2
(45) Date of Patent: Dec. 5, 2023

(54) CURABLE TWO-COMPONENT MASS

(71) Applicant: DELO INDUSTRIE KLEBSTOFFE GMBH & CO. KGAA, Windach (DE)

(72) Inventors: Kilian Raucheisen, Windach (DE); Felix Stark, Windach (DE); Timo Anselment, Windach (DE)

(73) Assignee: DELO INDUSTRIE KLEBSTOFFE GMBH & CO. KGAA, Windach (DE)

( * ) Notice: Subject to any disclaimer, the term of this patent is extended or adjusted under 35 U.S.C. 154(b) by 57 days.

(21) Appl. No.: 17/268,260

(22) PCT Filed: Aug. 19, 2019

(86) PCT No.: PCT/EP2019/072091
§ 371 (c)(1),
(2) Date: Feb. 12, 2021

(87) PCT Pub. No.: WO2020/043521
PCT Pub. Date: Mar. 5, 2020

(65) Prior Publication Data
US 2021/0301058 A1 Sep. 30, 2021

(30) Foreign Application Priority Data
Aug. 29, 2018 (DE) .................. 10 2018 121 067.1

(51) Int. Cl.
| | |
|---|---|
| C08F 290/06 | (2006.01) |
| C08F 2/50 | (2006.01) |
| C08G 18/58 | (2006.01) |
| C08G 18/81 | (2006.01) |
| C08G 59/24 | (2006.01) |
| C08G 59/50 | (2006.01) |
| C09J 151/08 | (2006.01) |
| C08G 18/00 | (2006.01) |

(52) U.S. Cl.
CPC ............ C08F 290/064 (2013.01); C08F 2/50 (2013.01); C08G 18/58 (2013.01); C08G 18/8116 (2013.01); C08G 59/245 (2013.01); C08G 59/5026 (2013.01); C09J 151/08 (2013.01); C08G 18/003 (2013.01); C08G 2170/00 (2013.01)

(58) Field of Classification Search
CPC ........ C08F 290/064; C08F 2/50; C08G 18/58; C08G 18/8116; C08G 59/245; C08G 59/5026; C08G 18/003; C08G 2170/00; C09J 151/08
USPC ....................................................... 525/403
See application file for complete search history.

(56) References Cited

U.S. PATENT DOCUMENTS

| | | | |
|---|---|---|---|
| 5,013,631 A | 5/1991 | Su | |
| 5,057,348 A | 10/1991 | Drain et al. | |
| 7,790,354 B2 | 9/2010 | Ishigaki et al. | |
| 8,969,457 B2 | 3/2015 | Briers | |
| 9,856,374 B2 | 1/2018 | Kelch et al. | |
| 10,227,445 B2 | 3/2019 | Koebler et al. | |
| 10,896,860 B2 | 1/2021 | Reil et al. | |
| 2002/0117259 A1* | 8/2002 | Giroux | ........................ C09J 5/00 156/330 |
| 2005/0072519 A1 | 4/2005 | Johnson et al. | |
| 2006/0240198 A1 | 10/2006 | Tanikawa et al. | |
| 2007/0218305 A1 | 9/2007 | Ishigaki et al. | |
| 2010/0196618 A1 | 8/2010 | Botrie et al. | |
| 2010/0236708 A1 | 9/2010 | Merz | |
| 2011/0054061 A1 | 3/2011 | Itano et al. | |
| 2013/0187144 A1 | 7/2013 | Briers | |
| 2015/0266996 A1 | 9/2015 | Koebler et al. | |
| 2015/0368466 A1 | 12/2015 | Kelch et al. | |
| 2016/0208042 A1 | 7/2016 | Klopsch et al. | |
| 2017/0233615 A1 | 8/2017 | Tanikawa et al. | |
| 2019/0211140 A1 | 7/2019 | Reichvilser et al. | |
| 2019/0304861 A1 | 10/2019 | Reil et al. | |

FOREIGN PATENT DOCUMENTS

| | | |
|---|---|---|
| CN | 1413225 A | 4/2003 |
| CN | 103154130 A | 6/2013 |
| CN | 104302720 A | 1/2015 |
| CN | 108291011 A | 7/2018 |
| DE | 60 2005 004 273 T2 | 2/2008 |
| DE | 11 2013 003 942 B4 | 5/2015 |
| DE | 102016117183 A1 | 3/2018 |
| EP | 0245559 A2 | 11/1987 |
| EP | 0245559 B1 | 11/1987 |
| WO | 2014131757 A1 | 9/2014 |
| WO | 2015049229 A1 | 4/2015 |
| WO | 2017044381 A1 | 3/2017 |
| WO | 2018011116 A1 | 1/2018 |

OTHER PUBLICATIONS

Senger et al. "Isocyanate-Epoxy Reactions in Bulk and Solution," Journal of Applied Polymer Science, 38, Jul. 20, 1989, No. 2, John Wiley & Sons, Inc., New York, US, XP000116285.
"Polymer Dictionary", Xinde Feng et al., p. 193, China Petrochemical Press, 1st edition, Jun. 30, 1998.

* cited by examiner

*Primary Examiner* — David T Karst
(74) *Attorney, Agent, or Firm* — McNees Wallace & Nurick LLC

(57) ABSTRACT

The invention relates to a curable two- or multi-part composition with (a) optionally an at least bifunctional epoxy-containing compound; (b) an at least bifunctional nitrogen-based curing agent suitable for epoxy curing; (c) a radiation-curable hybrid compound having both one or more radiation-curable methacrylate groups and one or more epoxy groups; (d) a radical photoinitiator; (e) optionally an accelerator for epoxy curing, and (f) optionally further additives. In addition, the invention relates to a method for the bonding, casting, molding or coating of substrates using the composition.

17 Claims, No Drawings

CURABLE TWO-COMPONENT MASS

FIELD OF THE INVENTION

The present invention relates to a two- or multi-part composition that can be fixed by irradiation and cured at room temperature or optionally by heating. The composition comprises at least one at least bifunctional nitrogen-based curing agent for epoxy compounds, a hybrid compound having both radiation-curable groups and epoxy groups crosslinkable by polyaddition, and a photoinitiator.

Moreover, the invention relates to a method for the joining, coating, molding or casting of substrates using the two- or multi-part mass.

TECHNICAL BACKGROUND

Due to the separation of the reactive components, two-part compositions offer the advantage that systems can be provided which are storage-stable at room temperature for long periods. The curing reaction does not start before the components are brought together and mixed. This proves to be useful, particularly in large-scale industrial applications.

However, in the case of polyaddition systems based on epoxy resins and amines, at room temperature several days may elapse until complete curing of the composition. Curing can be accelerated by heat input.

There are different approaches in the state of the art to accelerate the buildup of strength of the compositions. By using accelerators on the basis of alcohols, metal salts and/or tertiary amines, the periods until complete curing of the composition can be improved to the detriment of the processing time. Conversely, epoxy compositions having a long processing time often also need longer periods until they reach their final strength, or have to be heat-cured.

Apart from that, it is proposed, for two-part compositions, to quickly achieve an initial strength sufficient for the fixation of parts to each other by an irradiation step and radical polymerization.

EP 0 245 559 B1 discloses two-part compositions on the basis of epoxides and amines, as the curing agent, which additionally contain another radiation-curable compound and a photoinitiator in the epoxy resin component. As the curing agent, such amines are selected that are less reactive to addition to the double bond of the (meth)acrylates. Primary amines in particular, after mixing of the components, are spent uncontrolledly by addition to the acrylate groups of the radiation-curable compound, and are no longer available for curing of the epoxy groups. At the same time, the proportion of radiation-curable groups is reduced. Due to this side reaction, the maximum initial strength that can be achieved by light fixation becomes dependent upon the time of irradiation after mixing of the components. This allows only a very narrow process window in the application. Another disadvantage is the lack of freedom of formulation when selecting the curing agent. Even by selecting less reactive amines, undesired addition reactions cannot be completely excluded, leading to different properties between irradiated and non-irradiated areas in the cured composition.

U.S. Pat. No. 5,057,348 A describes casting compositions based on two-part systems. Apart from various amine curing agents, they also contain acrylates of a higher functionality. In these compositions, reaction of the curing agents with the acrylate constituents is similarly uncontrolled as in the case of EP 0 245 559 B, also leading to properties in the cured composition that are inhomogeneous and difficult to reproduce, as the networks formed essentially depend on the chronological order of the process steps. This is particularly disadvantageous for casting compounds requiring a reliable tension compensation.

WO 2018/011116 A1 discloses a method of generating a property gradient in a cured composition using light-fixable epoxy-amine compositions that additionally contain a radiation-curable acrylate compound and a photoinitiator. The different reaction speeds of the amines as compared to the acrylates and epoxy resins in conjunction with irradiation are specifically used to generate variable mechanical properties. To perform this method, precise shading of selected areas is required during irradiation to achieve various moduli of elasticity in the joint. Considering the increasing miniaturization of many parts in practice, this can often not be implemented with reasonable effort and expense. In addition, the described compositions cannot be formulated as two-part compositions in a storage-stable form.

Thus, the light-fixable two-part compositions described in the state of the art have a limited freedom of formulation and/or differences in the mechanical properties between irradiated and non-irradiated zones that are difficult to control.

SUMMARY OF THE INVENTION

It is an object of the invention to avoid the above-mentioned disadvantages of the compositions known from the state of the art.

In particular, the compositions should have a broad formulation range with respect to the curing agents. At the same time, the compositions should have sufficient dimensional stability in the light-fixed state to offer a wide range of applications in which initial fixation of parts by irradiation with actinic radiation is advantageous prior to processing the parts in further processes.

At the same time, the compositions according to the present invention are intended to be processable, without limitation, within a period of time reasonable for the respective application. The mechanical properties of the cured composition should differ as little as possible between irradiated and non-irradiated zones and be independent of the time of irradiation.

According to the present invention, these objects are achieved by a curable two- or multi-part composition according to claim 1.

Advantageous embodiments of the composition according to the present invention are stated in the sub-claims, which can optionally be combined with each other.

The composition according to the present invention comprises the following components: (a) optionally an at least bifunctional epoxy-containing compound; (b) an at least bifunctional nitrogen-based curing agent suitable for epoxy curing; (c) a radiation-curable compound comprising at least one hybrid compound, wherein the hybrid compound has both one or more radiation-curable methacrylate groups and one or more epoxy groups; (d) a radical photoinitiator; (e) optionally an accelerator for epoxy curing, and (f) optionally further additives.

The components of the two- or multi-part composition according to the present invention are preferably liquid at room temperature, and can be fixed by irradiation with actinic radiation after being mixed with each other. After mixing, the composition cures at room temperature within a few days or hours. Optionally, curing can be accelerated by heat.

Another object of the invention is the use of the composition according to the present invention as an adhesive or sealant for the bonding, casting, sealing or coating of substrates. The compositions are particularly suitable for the manufacture of optoelectronic structures and the production of electric motors.

The invention further relates to a method for the joining, coating, molding or casting of substrates using the composition according to the present invention. The composition applied to a substrate can be transferred into a dimensionally stable state by irradiation, and the composite can be further processed in subsequent process steps. Optionally, the irradiated composition can, for example, be eventually heat-cured in a furnace process.

Following complete curing, the two-part composition according to the present invention shows no substantial differences either in the irradiated or the non-irradiated areas regarding the mechanical properties, in particular with respect to the modulus of elasticity, the glass transition temperature and/or the elongation at break.

The processing time and the mechanical properties of the composition can be set by selecting from a wide range of epoxy compounds and curing agents as well as by the optional addition of accelerators and/or additives.

DETAILED DESCRIPTION OF PREFERRED EMBODIMENTS

The invention is described in the following in detail and by way of example using preferred embodiments which, however, are not to be construed as limiting.

In the sense of the invention, "two- or multi-part" or "two- or multi-part composition" means that the reactive compoonents of the composition are physically separated from each other. Preferably, the compositions according to the present invention are formulated as two-part compositions. In the following, the separated components are also referred to as resin component (A) and curing agent component (B). The resin component (A) and the curing agent component (B) can be composed of several (single) components which are compatible with each other. In the following, when referring to two-part compositions, these also comprise multi-part compositions.

For easy use of the compositions, the use of double-chamber cartridges (e.g. Mixpac series by Sulzer) is useful. Preferred volume mixing ratios of components (A)/(B) are in a range of 2:1 to 1:1. Static mixing tubes can be used for mixing and dosing.

In the sense of the invention, "liquid" means that the loss modulus G" determined by measuring the viscosity is larger than the storage modulus G' of the respective component at 23° C.

As far as the indefinite article "a" or "an" is used, this also comprises the plural form "one or more" unless explicitly excluded.

"At least bifunctional" means that, per molecule, two or more units of each functional group named are contained. No distinction is made between primary, secondary or tertiary functional groups.

All weight proportions set out below relate to the total weight of the reactive components (A) to (F). The proportions of non-reactive additives (G), such as fillers or plasticizers, are explicitly not to be considered for the total weight.

In the following, the mass (m) containing one mole of active hydrogen functionalities directly linked to a nitrogen atom is referred to as the active hydrogen equivalent weight (AHEW). Primary amines possess an active hydrogen functionality of 2, secondary amines possess an active hydrogen functionality of 1.

$$\text{AHEW [g/mol]} = m \text{ [g]}/n_{act\text{-}H} \text{ [mol]}.$$

In the following, the mass (m) containing one mole of epoxy functionalities is referred to as the epoxy equivalent weight (EEW).

$$\text{EEW [g/mol]} = m \text{ [g]}/n_{epoxy} \text{ [mol]}.$$

In the following, the mass (m) possessing one mole of radiation-curing functionality is referred to as the radiation-curable equivalent weight (SEW).

$$\text{SEW [g/mol]} = m \text{ [g]}/n_{radiation\text{-}curing\ groups} \text{ [mol]}.$$

The commercial trade names and/or the respective suppliers or manufacturers were added in brackets to the substance names used below.

Component (a): Epoxy Compound

The epoxy compound (a) is not further restricted in terms of its chemical structure and preferably comprises aromatic or aliphatic compounds having at least two epoxy groups in the molecule, such as glycidyl esters, glycidyl ethers, glycidyl amines, and mixtures thereof. In addition, component (a) can also contain monofunctional epoxy compounds as reactive diluents.

Preferably, aromatic glycidyl ethers are used in the compositions according to the present invention. They can be obtained from the reaction of epichlorohydrin with aromatic alcohols and phenols. Examples of such aromatic epoxy compounds and their respective trade names are bisphenol A epoxy resins (D.E.R. 331, Epikote Resin 828), bisphenol F epoxy resins (Epikote Resin 862, Epikote Resin 863, YDF-170), mixtures of bisphenol A and F diglycidyl ethers (D.E.R. 351, Epikote Resin 166, YDF-161), phenol-novolac epoxy resins (D.E.N. 424, D.E.N. 437, D.E.N. 440, YDPN-631) and cresol-novolac epoxy resins (DIC Corporation Epiclon N-670, YDCN-500-5P).

Furthermore, glycidyl ethers based on aromatic alcohols such as 1,6-dihydroxynaphthalene (Araldite MY 0816), tris(hydroxyphenyl)methane (Tactix 742), various bisphenols, hydroxy-substituted biphenylenes (e.g. jER YX4000H) or monofunctional glycidyl ethers, e.g. on the basis of p-tert-butylphenol (D.E.R. 727), cardanol (Cardolite NC-513) or nonylphenol (Erisys GE-12), can be used.

In addition, diglycidyl ethers on the basis of aliphatic alcohols such as butanediol (Araldite DY-D), hexanediol (Araldite DY-H), cyclohexanedimethanol (Araldite DY-C), polymeric diols (e.g. polyoxypropylene glycol, Araldite DY-F), dicylopentadiene dimethanol (Adeka EP 4088S) or amines and aminophenols such as TGAP (triglycidyl ether of aminophenol; Araldite MY 0610) or TGMDA (tetraglycidyl ether of methylenedianiline, Araldite MY 721) can be used.

Moreover, all completely or partially hydrogenated analogues of aromatic epoxy compounds can be used. Hydrogenated bisphenol A and bisphenol F epoxy resins (e.g. Eponex Resin 1510) are preferred.

Isocyanurates substituted with epoxy-containing groups and other heterocyclic compounds can also be used as component (a) in the compositions according to the present invention. Examples are triglycidyl isocyanurate and mono-allyldiglycidyl isocyanurate.

In addition, mono- and polyfunctional epoxy resins of all resin groups named containing, apart from the epoxy functionalities, additional functional groups can be used.

Examples are OH-functional oligomeric aromatic epoxy compounds (e.g. Dow D.E.R. 671 or Kukdo KD-9004).

Addition products of the epoxy compounds listed with H-acidic compounds (in their low molecular weight or polymeric form) such as carboxylic acids, alcohols and/or thiols can be used as well. Particularly preferred examples are reactive liquid rubbers, e.g. addition products of epoxy compounds with CTBN rubber (e.g. Albipox 2000) or dimer fatty acids (e.g. B-Tough A3).

A combination of several epoxy-containing compounds at least one of which is bifunctional or of a higher functionality is also in the sense of the invention.

In the composition according to the present invention, component (a) is preferably present in a proportion of 0 to 80 wt-%, based on the total weight of components (a) to (e). Particularly preferably, the proportion of component (a) is from 10 to 65 weight percent.

Monofunctional epoxy compounds can be contained in component (a) in a proportion of up to 20%, particularly preferably up to 10%, based on the total weight of component (a).

Component (b): At Least Bifunctional Curing Agent

The at least bifunctional nitrogen-based curing agent (b) for epoxy curing is preferably selected from the group of primary and secondary amines, and comprises compounds with at least two amino groups per molecule suitable for epoxy curing.

Component (b) is not further restricted in terms of its chemical structure, and preferably comprises aromatic, aliphatic, cycloaliphatic amines, polyamines, (poly)ether amines, amine-modified rubbers, N-containing heterocyclene and amine adducts such as polyamides, polyamidoamines and Mannich bases, and combinations thereof.

Preferably, the at least bifunctional amine is selected from the group consisting of aliphatic or cycloaliphatic amines, polyether amines, polyamides, Mannich bases or their reaction products with epoxy resins, and combinations thereof.

Examples of commercially available aliphatic amines and polyamines are ethylenediamine (EDA), diethylenetriamine (DETA), triethylenetetraamine (TETA), aminoethylpiperazine (N-AEP), N,N'-bis(3-aminopropyl)piperazine (BAPP) as well as dimer fatty acid diamines (Priamin 1071). They are commercially available from DowDuPont or Hexion, e.g. under the trade names EPIKURE Curing Agent 3200, 3223, 3234, 3245. Commercially available examples of cycloaliphatic amines are, for example, isophorone diamine (Evonik, Versamid IPD), octahydro-4,7-methanoindene-1 (2),5(6)-dimethane amines (Oxea, TCD-diamine), piperazine (DowDuPont) or Jeffamine RFD-270 from Huntsman containing both cycloaliphatic and polyether building blocks.

(Poly)ether amines can be obtained from Huntsman (examples: Jeffamine T-404, T-3000, THF-100, DER-148, ED-600, D-230, D2000), Hexion (EPIKURE Curing Agent 3230, 3233) or BASF (Baxxodur EC 130, EC 302, EC 311).

Amine adducts are reaction products of amines and further constituents and comprise, for example, polyamides (Versamid 140), polyamidoamines (Aradur 955) or Mannich bases (Epikure Curing Agent 105 or 110, Cardolite NC-557). Reactive liquid rubbers or other amino-functionalized polymers are preferred constituents of component (b). Examples are functionalized butadiene-nitrile rubbers (Hypro ATBN 1300×16).

The use of aliphatic amines, (poly)ether amines, Mannich bases, polyamides or mixtures thereof is particularly preferred in the composition according to the present invention.

Preferably, reaction products of said amino compounds and epoxy compounds can be used as well.

Preferably, the curing agent (b) is present in liquid form.

The above list is to be considered as exemplary rather than final. Mixtures of said curing agents (b) are also in the sense of the invention.

The proportion of the at least bifunctional curing agent (b) in the composition according to the present invention is 5 to 90 wt-%.

The ratio of the reactive components in the compositions according to the present invention can be set by means of the equivalent ratio EEW/AHEW allowing the properties of the cured composition to be controlled. For example, excessive amine results in more flexible materials. An excess of epoxy groups can increase the strength of the cured composition in the subsequent heat treatment.

Preferably, an EEW/AHEW ratio of 0.8 to 1.2 is used, and particularly preferably the ratio is in a range of 0.95 to 1.05.

Component (c): Radiation-Curable Compound

Component (c) comprises compounds that can be cured by actinic radiation. According to the present invention, component (c) comprises a radiation-curable hybrid compound (c1) having both one or more methacrylate groups and one or more epoxy groups.

With respect to the radiation-curable methacrylate groups, the hybrid compound (c1) is preferably bifunctional or of a higher functionality. Furthermore, with respect to the epoxy group crosslinkable by polyaddition, the hybrid compound (c1) is preferably at least bifunctional. However, hybrid compounds (c1) which are monofunctional with respect to the methacrylate groups, and bifunctional or of a higher functionality with respect to the epoxy groups, or vice versa, can be used as well.

In a first embodiment, a radiation-curable hybrid compound (c1) carrying both one or more methacrylate groups and one or more epoxy groups can be obtained from the reaction of an isocyanatomethacrylate (c2) with a hydroxy-functional epoxy-containing compound (c3). Optionally, catalysts can be used for acceleration of this reaction.

Suitable isocyanatomethacrylates (c2) are, for example, reaction products such as can be obtained by reacting aliphatic, cycloaliphatic and/or aromatic at least bifunctional isocyanates (c4) with hydroxy-functional methacrylates (c5) according to a method from DE 3 025 227A1. Preferably, the diisocyanate is used in a surplus of 20 wt-% or more. Surplus non-reacted monomeric diisocyanates (c4) can optionally be separated from the reaction blend by distillation, for example by vacuum distillation by means of a thin-layer evaporator or a thin-film evaporator. Such distillation methods are described in the plastics manual vol. 7, "Polyurethanes", G. W. Becker (editor), Hanser-Verlag, Munich, $3^{rd}$ edition 1993, page 425.

Suitable diisocyanates (c4) comprise hexamethylene diisocyanate, isophorone diisocyanate, 4,4'-diisocyanatodicyclohexylmethane, methylene diphenyl isocyanate, toluene-2,4-diisocyanate and toluene-2,6-diisocyanate, commercially available under the trade name Desmodur from Covestro AG, and meta-tetramethylxylylene diisocyanate from Allnex Germany GmbH.

Examples of hydroxy-functional methacrylates (c5) are 2-hydroxyethyl methacrylate, 2-hydroxypropyl methacrylate and glycerol dimethacrylate, commercially available under the trade name Visiomer from Evonik Performance Materials GmbH, as well as pentaerythritol trimethacrylate or mixtures of said raw materials.

Suitable catalysts accelerating the reaction of isocyanate groups with hydroxy groups comprise organometallic compounds of tin, iron, titanium or bismuth such as dibutyltin or dioctyltin diacetate, dibutyltin or dioctyltin dilaurate and tributyltin acetate. Further catalysts are tin(II) salts and bismuth(III) salts of carboxylic acids such as tin(II)-acetate, tin(II)-2-ethylhexanoate and bismuth(III)-neodecanoate.

To incorporate hard and soft segments into compound (c2), said diisocyanates (c4) can also be reacted first with polyols, for example based on polyether, polycarbonate and/or polybutadiene, as long as an NCO/OH ratio of at least 2:1 is maintained. Eventually, the thus chain-extended bifunctional isocyanates can be reacted with hydroxy-functional methacrylates (c5).

To achieve a higher light fixation strength at irradiation, the use of hydroxymethacrylates of a higher functionality (c5) can be useful for synthesizing the hybrid compound (c1). Methacrylate functionalities of at least 2 are preferred. Hydroxymethacrylates of a higher functionality (c5) are obtainable from the esterification of at least trifunctional alcohols with methacrylic acid.

According to another preferred embodiment, commercially available isocyanatomethacrylates (c2) can also be used for the reaction with hydroxy-functional epoxy-containing compounds (c3).

Such isocyanatomethacrylates (c2), e.g. 2-isocyanato-ethyl methacrylate or 2-(2-isocyanatoethyloxy)ethyl methacrylate, are available under the labels Karenz MOI or Karenz MOI-EG from Showa Denko Europe GmbH.

These commercially available monofunctional isocyanatomethacrylates (c2) offer the advantage that the radiation-curable hybrid compound (c1) can be obtained by reaction with hydroxy-functional epoxides (c3) in a single step.

Preferred examples of hydroxy-functional epoxy-containing compounds (c3) are oligomeric or polymeric glycidyl ethers of bisphenols such as bisphenol A-based epoxy resins (e.g. DowDupont D.E.R. 671) or bisphenol F-based epoxy resins (e.g. Kukdo KD-9004).

Hydroxy-functional epoxy-containing compounds (c3) having a hydroxy functionality of 2 or more are preferably used. When completely reacted with the described isocyanatomethacrylates (c2), the hybrid compounds according to the present invention (c1) preferably contain more than one radiation-curable methacrylate group.

In another embodiment, compound (c1), also having, apart from at least one methacrylate group, at least one epoxy group, can be obtained by reaction of methacrylate-functionalized silanes (c6) with hydroxy-functional epoxides (c3) in a condensation reaction. Preferably, the reaction occurs at an alkoxysilane/OH ratio of at least 2:1 in the presence of a suitable catalyst such as a Lewis acid on the basis of tin, titanium or zinc, in particular dibutyltin dilaurate, dioctyltin dilaurate or zinc(II)-acetylacetonate. Alternatively, amine catalysts such as aliphatic tertiary amines or unsaturated bicyclic amines, in particular triethylamine or diazabicycloundecene, can be used. Optionally, the surplus of non-reacted methacrylalkoxysilane (c6) can be separated by distillation.

Commercially available compounds (c6) comprise 3-methacryloxypropyltrimethoxysilane, methacryloxymethyl)methyldimethoxysilane, methacryloxymethyltrimethoxysilane and 3-methacryloxypropyltriacetoxysilane, available from Wacker under the trade names GF 31, XL 32, XL 33 and GF 39.

It can be advantageous to produce component (c1) in inert solvents such as tetrahydrofuran, acetone or ethyl acetate, which can be removed by distillation after synthesis. Monofunctional epoxy compounds from the group of component (a) can be selected as reactive diluents.

The use of radiation-curable hybrid compounds with acrylate groups in component (c) is not preferred as they can react, after mixing of the components, by addition to the amine curing agent (b).

As, in the case of methacrylate groups, the addition reaction of the amine curing agent to the double bond is substantially slower, the desired epoxy-amine polyaddition dominates, allowing the formation of a network that, after curing, has comparable mechanical properties in both the irradiated and non-irradiated zones.

However, depending on the intended use of the compositions, a proportion of compounds with radiation-curable acrylate groups in the compositions according to the present invention can be tolerated as long as the desired processing time can be maintained and the mechanical properties of the cured composition in the irradiated and non-irradiated areas do not differ from each other to an extent undesired for the respective application.

The proportion of the hybrid compound (c1) in the composition according to the present invention is preferably selected such that the amount of substance of radiation-curable methacrylate groups of the hybrid compounds is 50 to 100%, preferably 70 to 100%, each based on the radiation-curable equivalent weight (SEW) of the composition.

To achieve a higher light-fixation strength at short exposure times, it is also possible to use an additional radiation-curable compound (c7) in the compositions according to the present invention in an amount of at most 50%, based on the radiation-curable equivalent weight (SEW) of the composition. The additional radiation-curable compound (c7) is preferably a (meth)acrylate-containing compound that is bifunctional or of a higher functionality, more preferably an at least bifunctional methacrylate. Particularly preferably, the (meth)acrylate-containing compound that is bifunctional or of a higher functionality (c7) is present in a proportion of at most 30%, based on the radiation-curable equivalent weight (SEW) of the composition. Proportions of more than 50% of the additional radiation-curable compound can massively change the mechanical properties of the cured composition in shadow zones as compared to irradiated areas and are thus not in the sense of the invention.

Also with regard to the additional radiation-curable compound, the use of radiation-curable compounds (c7) with acrylate groups is possible though not preferred.

A combination of several radiation-curable compounds (c7) is also in the sense of the invention as long as a proportion of 50%, based on the radiation-curable equivalent weight (SEW) of the composition, is not exceeded.

Examples of commercially available at least bifunctional methacrylates (c7) comprise 1,4-butanediol dimethacrylate (Sartomer SR214), bisphenol A glycidyl methacrylate (bis-GMA, Esstech Inc.) diurethane dimethacrylate (VISIOMER HEMATMDI, Evonik Industries) or trimethylolpropane trimethacrylate (Sartomer SR350D). A suitable acrylate is, for example, trimethylolpropane triacrylate (Sigma Aldrich).

In the compositions according to the present invention, component (c) is present in a proportion of at least 10 wt-%, preferably in a proportion of at least wt-% and particularly preferably of at least 30 wt-%. Preferably, the maximum proportion of component (c) is up to 80 weight percent.

The epoxy groups of the radiation-curable compounds (c) have to be considered when calculating the EEW.

In another embodiment, if the radiation-curable compound (c1) has two or more epoxy groups per molecule, the bifunctional epoxy compound of component (a) is not necessary. However, the composition preferably contains both an at least bifunctional epoxy compound of component (a) and a hybrid compound (c1) with one or more epoxy groups in the molecule.

Component (d): Photoinitiator

Apart from the radiation-curable hybrid compound (c1), the compositions also contain a photoinitiator (d) to activate radical polymerization. As radical photoinitiators, the usual commercially available compounds can be used, such as α-hydroxyketones (Irgacure 184, Irgacure 2959), benzophenone, α,α'-diethoxyacetophenone, 4,4-diethylaminobenzophenone, 2,2-dimethoxy-2-phenylacetophenone (Irgacure 651), 4-isopropyl phenyl-2-hydroxy-2-propylketone, 1-hydroxycyclohexylphenylketone, isoamyl-p-dimethylaminobenzoate, methyl-4-dimethylaminobenzoate, methyl-o-benzoylbenzoate, benzoin, benzoin ethyl ether, benzoin isopropyl ether, benzoin isobutyl ether, 2-hydroxy-2-methyl-1-phenylpropane-1-one, 2-isopropylthioxanthone, dibenzosuberone, 2,4,6-trimethylbenzoyldiphenylphosphine oxide (Irgacure TPO), bisacylphosphine oxide (Irgacure 819), iodonium salts or metallocenes (Irgacure 784), wherein said photoinitiators can be used alone or in a combination of two or more of said compounds.

For example, the IRGACURE™ types from BASF SE can be used as UV-photoinitiators, such as the IRGACURE 500, IRGACURE 1179, IRGACURE 745, IRGACURE 369 (2-benzyl-2-dimethylamino-1-(4-morpholinophenyl)-butanone-1), IRGACURE 907 (2-methyl-4'-(methylthio)-2-morpholinopropiophenone), IRGACURE 1300 (α-aminoketone), IRGACURE 819DW, IRGACURE 2022, IRGACURE 2100, IRGACURE 250, IRGACURE TPO-L types. Moreover, the DAROCUR™ types from BASF SE can be used, such as the DAROCUR MBF, DAROCUR 1173 and DAROCUR 4265 types.

The photoinitiator used as component (d) in the compositions according to the present invention can preferably be activated by actinic radiation of a wavelength from 200 to 600 nm, particularly preferably from 320 to 480 nm. As required, the photoinitiator can be combined with a suitable sensitizing agent.

The use of several photoinitiators (d) is also in the sense of the invention.

Liquid photoinitiators such as Irgacure TPO-L are particularly preferred.

In the compositions according to the present invention, the photoinitiator (d) is preferably present in a proportion of 0.01 to 5 wt-%, based on the total weight of the reactive components (a) to (e).

Component (e): Accelerator

In the compositions according to the present invention, e.g. amines, alcohols and/or metal salts can be used as accelerators.

In particular, tertiary amines such as tris-(dimethylaminomethyl)phenol available from Evonik under the trade name Ancamine K54 are suitable as amines. The corresponding alcohols acting as an accelerator especially comprise phenols such as p-tert-butylphenol (Songnox PTBP), cardanol (Cardolite NC-700) or nonylphenol and their derivatives, as well as benzyl alcohol. Metal salts such as $Ca(NO_3)_2$ or $Ca(OTf)_2$ as well as metal salt complexes can also be used to accelerate epoxy curing.

In the compositions according to the present invention, the accelerator (e) is preferably present in a proportion of 0.01 to 5 wt-%, based on the total weight of the reactive components (a) to (e).

The accelerator (e) is preferably incorporated in the curing agent component (B).

The use of several accelerators is also in the sense of the invention.

Component (f): Further Additives

Apart from components (a) to (e), the compositions according to the present invention can contain further additives (f). Preferred additives (f) are toughness modifiers such as core-shell particles (Kaneka KaneAce™ series, Dow Paraloid™ EXL series, Wacker Genioperl®) or block copolymers, reactive elastifying agents (such as blocked isocyanate prepolymers according to U.S. Pat. No. 5,278,257 A), colorants, pigments, fluorescent agents, thixotropic agents, thickeners, stabilizers, antioxidants, plasticizers, fillers, flame retardants, corrosion inhibitors, inert diluents, catalysts, leveling and wetting additives and adhesion promoters, as well as combinations thereof.

As fillers, inorganic and organic fillers can be used. These can be contained in the composition according to the present invention in a proportion of 0 to 90 wt-%, based here on the total weight of the composition from components (a) to (f). All of the other said additives are preferably present in the compositions according to the present invention in a proportion of 0 to 20 wt-%, also based on the total weight of the composition.

For example, hindered phenols (e.g. 2,6-di-t-butyl-4-methylphenol), substituted hydroquinone monoalkyl ethers (MeHQ; hydroxyquinone monomethyl ether), hindered amine light stabilizers (HALS), phosphites or aromatic thioethers can be used as stabilizers for both the liquid formulations and the cured compositions.

Preferably, said stabilizers are already used in the production of the hybrid compound (c1).

Formulation of the Compositions According to the Present Invention:

The composition according to the present invention is preferably provided as a two-part composition having a resin component (A) and a curing agent component (B) physically separated from the resin component (A). The resin component (A) preferably comprises the at least bifunctional epoxy compound of component (a), the hybrid compound (c1) and the photoinitiator (d). The curing agent component (B) preferably comprises the nitrogen-based curing agent of component (b) and the accelerator (e).

According to a preferred embodiment, the composition according to the present invention consists of the following components:

a) optionally an at least bifunctional epoxy-containing compound and optionally a monofunctional epoxy compound as a reactive diluent;
b) an at least bifunctional nitrogen-based curing agent suitable for polyaddition to an epoxy compound;
c) a radiation-curable hybrid compound (c1) carrying both one or more methacrylate groups and one or more epoxy groups, and optionally an additional radiation-curable compound, wherein the amount of substance of radiation-curable methacrylate groups of the hybrid compound is at least 50%, based on the radiation-curable equivalent weight (SEW) of the composition;
d) a radical photoinitiator;
e) optionally an accelerator; and
f) optionally further additives.

According to another preferred embodiment, the composition according to the present invention consists of the following components, each based on the total weight of components a) to e):

a) 10 to 65 weight percent of an at least bifunctional epoxy-containing compound and 0 to 15 weight percent of a monofunctional epoxy compound as a reactive diluent;
b) 5 to 90 weight percent of an at least bifunctional nitrogen-based curing agent suitable for polyaddition to an epoxy compound;
c) 10 to 80 weight percent of a radiation-curable compound, wherein the radiation-curable compound comprises at least one hybrid compound (c1) carrying both one or more methacrylate groups and one or more epoxy groups, and optionally another radiation-curable compound (c7), wherein the amount of substance of radiation-curable methacrylate groups of the hybrid compound is 50 to 100%, preferably 70 to 100%, based on the radiation-curable equivalent weight (SEW) of the composition;
d) 0.01 to 5 weight percent of a radical photoinitiator;
e) 0.01 to 5 weight percent of an accelerator for epoxy curing; and
f) optionally further additives.

An exemplary formulation of the two-part composition according to the present invention preferably comprises the following components, wherein the weight percentages mentioned are based respectively on the total weight of resin component (A) and curing agent component (B):

Resin Component (A):
(a) 20 to 50 wt-% of a bisphenol A/F diglycidyl ether;
(c) 15 to 50 wt-% of a radiation-curable hybrid compound (c1) that has both one or more methacrylate groups and one or more epoxy groups and can preferably be obtained from the reaction of a bifunctional epoxy compound (c3) containing hydroxy groups with an isocyanate-functionalized methacrylate (c2);
(d) 0.1 to 5 wt-% of a radical photoinitiator;
(f) 0 to 60 wt-% of one or more additives, preferably from the group of thixotropic agents, core-shell rubbers, inorganic fillers, stabilizers and adhesion promoters, and combinations thereof.

Curing Agent Component (B):
(b) 10 to 100 wt-% of a curing agent on the basis of amines, in particular from the group of (poly)ether amines and/or cycloaliphatic amines;
(f) 0 to 90 wt-% of additives comprising thixotropic agents, core-shell rubber, inorganic fillers and adhesion promoters.

The mixing ratio of resin component (A) to curing agent component (B) results from the equivalent weights EEW (epoxy equivalent weight) [g/mol of epoxide] of resin component (A) and AHEW (active hydrogen equivalent weight) [g/mol of act-H] of curing agent component (B).

Preferably, the mixing ratio of component (A) to component (B) is selected such that an EEW/AHEW equivalent weight ratio of 0.8 to 1.2, and particularly preferably of 0.95 to 1.05, is achieved.

According to a preferred embodiment, the formulations consist of said components.

Use of the Compositions According to the Present Invention

Due to the possibility of light-fixation and the option of curing at room temperature, the compositions according to the present invention are suitable for fast energy-efficient industrial processes with short cycle times which, at the same time, require the thermal load on the parts involved to be as low as possible.

Thus, another object of the invention is the use of the compositions according to the present invention as an adhesive, casting composition, molding composition or sealant for the bonding, casting, sealing or coating of substrates. The fields of application set out below are exemplary rather than final.

The compositions can be used for fast fixation of holders as used, for example, in aircraft interiors for the assembly of cables or attachment parts. The compositions according to the present invention are also useful for casting applications in which the geometry can be fixed by irradiation and thus the number of assembly devices can be reduced. They can also be used in the bonding of magnets during the manufacture of electric motors. Due to the large mass and heat capacity of the parts, curing at room temperature is particularly useful in this sector to save energy.

Furthermore, the compositions according to the present invention are suitable for the precision fabrication of parts, in particular optoelectronic elements.

Light-Fixation

The compositions according to the present invention can preferably be transferred into a dimensionally stable state by irradiation with actinic radiation of a wavelength ranging from 200 to 600 nm, preferably from 320 to 480 nm. The use of energy-saving LED lamps emitting light of a wavelength ranging from 365 nm to 405 nm is particularly preferred.

Under these conditions, the methacrylate groups of the hybrid compound (c1) and optionally of the additional radiation-curable compound (c7) are crosslinked by radical polymerization. The compositions fixed this way are sufficiently dimensionally stable, and can be quickly advanced to processing in further process steps before curing is completed.

The penetration depth of the actinic radiation, and thus the thickness of the light-fixed layer, can be controlled by means of the irradiation dose, the amount and type of fillers and additives used, and the wavelength used.

Curing of the Compositions According to the Present Invention

At room temperature, the compositions according to the present invention achieve a sufficient green strength that is sufficient for further processing of the fabricated parts without additional irradiation in less than 10 h, preferably in less than 6 h, particularly preferably in less than 4 h.

Final curing occurs at room temperature within 7 days, preferably within 5, and particularly preferably within 3 days. The curing reaction can be accelerated by heat.

At a temperature of less than 60° C., the compositions can be completely cured within 4 h, preferably within 2 h. At a temperature of 80° C., curing can be completed typically within 2 h, preferably within 1 h.

Temperature-graduated curing profiles are also in the sense of the invention.

Heat input can occur, for example, in convection ovens, by thermodes, IR radiators, laser or induction.

Joining and Coating Methods Using the Compositions According to the Present Invention The compositions according to the present invention offer the advantage in joining processes that parts or molded bodies can be fixed in their position by irradiation with actinic radiation.

A corresponding method for the bonding, casting, molding or coating of substrates using the compositions according to the present invention preferably comprises the following steps:
a) mixing the resin component (A) with the curing agent component (B);
b) dosing the composition onto a first substrate;

c) optionally supplying a second substrate to form a substrate composite, wherein the second substrate is brought into contact with the composition, and optionally one of the two substrates is aligned relative to the other;

d) irradiating the composition with actinic radiation, whereby the irradiated composition achieves a fixation strength that is sufficient for further processing of the first substrate or the substrate composite; and e) optionally maintaining a waiting time at room temperature until the composition is cured, or heating the irradiated composition on the substrate or in the substrate composite to reduce the waiting time or until curing.

By means of the method according to the present invention, a high position stability of the joined parts until final curing can be implemented. Thus there is virtually no need for conventional fixing aids that, in practice, cannot be used for miniaturized parts or would mean unreasonable additional effort and expense.

If required by the application, the first and second substrates, after joining, can optionally be aligned relative to each other before the composition is fixed by irradiation. Such an alignment is preferably required in the fabrication of optoelectronic parts such as camera modules (active alignment).

Measuring Methods Used and Definitions

Irradiation

For irradiation, the compositions according to the present invention are irradiated at a wavelength of 365 nm with an intensity of 200±20 mW/cm 2 for a period of 60 s using a DELOLUX 20/365 LED lamp from DELO Industrie Klebstoffe GmbH & Co. KG.

Determination of the Processing Time

The processing time was determined according to DIN EN 14022:2010 (Method 1) using a Physica MCR302 rheometer from Anton Paar having a standardized PP20 measuring stamp with a measuring gap of 1000 µm and a temperature of +23° C. The processing time is defined as the period of time, starting from mixing of the components, within which the apparent viscosity $|\eta^*|$ is doubled when using an oscillating measurement method with an amplitude $\gamma$ of 1% and a frequency f of 1 $s^{-1}$. The adhesive (3 g in total) was mixed manually by means of a spatula on a PE-coated mixing pad. The compositions according to the present invention are considered as unrestrictedly processable until their viscosity has doubled. In particular, the compositions according to the present invention can be unrestrictedly dosed within the processing time and fixed by irradiation.

Curing

"Crosslinking" or "curing" is defined as a polymerization or addition reaction beyond the gel point. The gel point is the point at which the storage modulus G' becomes equal to the loss modulus G". Curing of the specimens occurs at room temperature for 7 days.

Room Temperature

Room temperature is defined as 23±2° C.

Assessment of Light-Fixation

To assess the light-fixation (solid vs. liquid), the compositions are subjected to an optical assessment. Optionally, a haptic test is performed using a plastic spatula.

Flow Behavior (Run-Off Test)

As a specimen, a non-absorbent coated cardboard with a thickness of 1.5 mm and an edge length of 100 mm×174 mm is used.

A start line parallel to the short edges (distance: approx. 15 to 30 mm) is marked on the specimen. Above the line, drops of the compositions to be tested of approx. 0.1 g are applied while the cardboard is laid on a horizontal surface. The specimen is kept in this position for 1 min. Then the drop of adhesive is optionally irradiated according to the parameters set out under the point "Irradiation". Then, the specimen is placed vertically and remains in this position during the test period (24 h), wherein the adhesive, depending on its flowability, travels down a more or less longer distance. The test was performed at room temperature.

After the test time (24 h) has elapsed, the specimen is returned to the horizontal position and the run-off path of the adhesive is determined by measuring the distance traveled from the start line to the lowest end of the respective flow front. If the composition flows to the end of the specimen, the flow path to the end of the cardboard is measured and marked with a "greater-than" sign (">x mm").

Determination of the Tensile Properties

Tensile properties including modulus of elasticity, tensile strength and elongation at break were determined on the basis of DIN EN ISO 527-2:2012-06, using type 5A specimens. The test speed to determine the modulus of elasticity was 1 mm/min, the test speed to determine the tensile strength and elongation at break was 10 mm/min. The test was performed at room temperature on an AllroundLine 20 kN universal test machine from Zwick Roell. The curing time was 7 days at room temperature in the dark. Optionally, irradiation with actinic radiation for 60 s on both sides was performed directly after introducing the mixed composition into the curing mold.

Determination of the Glass Transition Temperature ($T_G$)

The glass transition temperature was determined by means of differential scanning calorimetry (DSC) according to DIN EN ISO 11357-1:2017-2, using Al crucibles with a volume of 40 µl and a perforated lid in which the products were optionally irradiated according to the parameters set out under the point "Irradiation" and cured for 7 days at room temperature. Measurement was performed with a DSC2 from Mettler Toledo in two heating courses from 0° C. to 220° C., with a heat rate of 10 K/min in the first heating course and 20 K/min in the second heating course. To evaluate the $T_G$, the half-step-height method according to ISO 11357-2:2013 was used in the second heating course.

Manufacture of Curable Compositions

All compounds used for the production of the curable compositions and their abbreviations are listed below:

Component (a): Epoxy Compound
- (a1): Epikote™ Resin 169 (mixture of bisphenol A and bisphenol F glycidyl ethers; available from Hexion);
- (a2): Epikote™ Resin 166 (mixture of bisphenol A and bisphenol F glycidyl ethers; available from Hexion);
- (a3): D.E.N 438 (epoxy-novolac resin; available from DowDupont);
- (a4): Epikote Resin 828LVEL (low-chlorine bisphenol A resin, available from Hexion);

Component (b): At Least Bifunctional Curing Agent
- (b1): Aradur 140 (polyamidoimidazole; available from Huntsman);
- (b2): Baxxodur EC-130 (polyether amine; available from BASF SE);
- (b3): N-aminoethylpiperazine (available from Sigma-Aldrich);
- (b4): m-xylylenediamine (available from Sigma-Aldrich);
- (b5): Cardolite Lite 2002 (phenalkamine; available from Cardolite); and
- (b6): epoxy-amine adduct from the reaction of (a4) and (b4) according to manufacturing example 5.

Component (c): Radiation-Curable Compound
- (c1-1): hybrid compound according to manufacturing example 1;
- (c1-2): hybrid compound according to manufacturing example 3;
- (c2-1): Karenz MOI (2-isocyanatoethyl methacrylate; available from Showa Denko Europe GmbH);
- (c2-2): Isocyanatomethacrylate according to manufacturing example 2;
- (c3-1): D.E.R. 671 Epoxy Resin (solid hydroxy-functional epoxy resin based on bisphenol A; available from DowDupont);
- (c5-1): 2-hydroxyethyl methacrylate (available from Sigma-Aldrich)
- (c7-1): TMPTMA trimethylolpropane trimethacrylate (available from Sigma-Aldrich);
- (c7-2): TMPTA trimethylolpropane triacrylate (available from Sigma-Aldrich);
- (c8): acrylate-based hybrid compound according to manufacturing example 4; and
- (c9): Karenz A01 (2-isocyanatoethylacrylate; available from Showa Denko Europe GmbH).

Component (d): Photoinitiator
- (d1): Irgacure TPO-L (available from Lambson)

Component (f): Further Additives
- (f1): Dynasilan Glymo from Evonik (adhesion promoter);
- (f2): Hydroquinone monomethyl ether; available from Sigma-Aldrich (stabilizer);
- (f3): 2,6-di-tert-butyl-4-methylphenol; available from Sigma-Aldrich (stabilizer); and
- (f4): dibutyltin dilaurate; available from Sigma-Aldrich (catalyst).

Manufacture of the Radiation-Curable Compound (c1)

Manufacturing Example 1: Hybrid Compound (c1-1)

742.50 g of Epikote Resin 169 (a1) was placed into a reaction vessel equipped with a suitable stirrer. Then the temperature was increased to 90° C. 495.00 g of D.E.R. 671 Epoxy Resin (c3-1) was added under constant stirring and homogenized for 4 hours at this temperature. Then the temperature was reduced to 50° C., and 0.43 g of hydroquinone monomethyl ether (f2), 0.43 g of 2,6-di-tert-butyl-4-methylphenol (f3) and 0.56 g of dibutyltin dilaurate (f4) were added. 154.40 g of Karenz MOI (c2-1) was added under constant stirring. Then, the temperature was increased to 60° C. The reaction was kept at this temperature for 3 hours. The disappearance of the NCO absorption in the infrared absorption spectrum was determined, then the reaction was stopped. The product obtained was the hybrid compound (c1-1), dissolved at 47% in 53% epoxy compound (a1).

Manufacturing Example 2: Isocyanatomethacrylate (c2-2)

333.44 g (1.50 mol) of isophorone diisocyanate (IPDI) (c4-1) was placed in a reaction vessel equipped with a suitable stirrer. 1.05 g of hydroquinone monomethyl ether (f2) and 1.05 g of 2,6-di-tert-butyl-4-methylphenol (f3) were added and dissolved under dry pressurized air. Then 0.50 g of dibutyltin dilaurate (f4) was added and the temperature was reduced to 15° C. At this temperature, 191.38 g (1.47 mol) of 2-hydroxyethyl methacrylate (c5-1) was added under constant stirring. Then the temperature was slowly increased to 50° C. The reaction was stirred for 3 hours at this temperature until an NCO content of 11.60% was achieved. A virtually colorless clear isocyanatomethacrylate (c2-2) was obtained.

Manufacturing Example 3: Hybrid Compound (c1-2)

877.50 g of Epikote Resin 169 (a1) was placed in a reaction vessel equipped with a suitable stirrer. Then the temperature was increased to 90° C. 247.50 g of D.E.R. 671 Epoxy Resin (c3-1) was added under constant stirring and homogenized at this temperature for 4 hours. Then the temperature was reduced to 50° C., and 0.13 g of dibutyltin dilaurate (f4) was added. 174.74 g of isocyanatomethacrylate (c2-2) was added under constant stirring. Then the temperature was slowly increased to 70° C. The reaction was kept at this temperature for 6 hours. The disappearance of the NCO absorption in the infrared absorption spectrum was determined, then the reaction was stopped. The product obtained was the hybrid compound (c1-2), dissolved at 32% in 68% epoxy compound (a1).

Manufacturing Example 4: Acrylate-Based Hybrid Compound (c8)

742.50 g of Epikote Resin 169 (a1) was placed in a reaction vessel equipped with a suitable stirrer. Then the temperature was increased to 90° C. 495.00 g of D.E.R. 671 Epoxy Resin (c3-1) was added under constant stirring and homogenized at this temperature for 4 hours. Then the temperature was reduced to 50° C. and 0.40 g of hydroquinone monomethyl ether (f2), 0.41 g of 2,6-di-tert-butyl-4-methylphenol (f3) and 0.55 g of dibutyltin dilaurate (f4) were added. 140.40 g of Karenz A01 (c9) was added under constant stirring. Then the temperature was increased to 60° C. The reaction was kept at this temperature for 3 hours. The disappearance of the NCO absorption in the infrared absorption spectrum was determined, then the reaction was stopped. The product obtained was the hybrid compound (c8), dissolved at 46% in 54% epoxy compound (a1).

Manufacturing Example 5: Curing Agent (b6)

32 g of Epikote Resin 828LVEL (a4) was provided in a suitable stirring device. In the course of 30 minutes 65 g of m-xylylenediamine (b4) was added dropwise at room temperature while stirring. The temperature was increased to 40° C. and kept there until the end of the exothermic reaction (4 hours). The reaction product obtained (b6) is an epoxy-amine adduct of (a4) and (b4) with an AHEW of 56 g/mol.

Formulation of the Curable Compositions

To formulate the curable compositions used in the following examples, first the constituents of resin component (A) according to Table 1 are provided. To this end, the amounts of components (a), (c), (d) and (f) mentioned are mixed in a PP box suitable for use in a speed mixer (Hauschild) until a homogeneous composition is formed. Components which are solid at room temperature or difficult to process due to their high viscosity can be additionally heated. Then the photoinitiator (d1) is added under ambient light that is outside the excitation wavelengths of the photoinitiator (d1) or any sensitizer. Finally, the composition is re-mixed and air contained therein is removed at a pressure of 10 hPa. For compositions of a higher viscosity production in a planetary mixer can be useful.

To produce the curing agent component (B), all constituents of the curing agent (b) and optionally further additives (f) are weighed into a PP box suitable for use in a speed mixer (Hauschild) and mixed in the speed mixer at a pressure of 10 hPa until a homogeneous composition is formed.

To manufacture the examples according to the present invention and the comparative examples from Table 1, the resin component (A) and the curing agent component (B) are weighed into a suitable PP box according to the mass fractions mentioned and mixed in the speed mixer. This occurs under ambient light that is outside the excitation wavelengths of the photoinitiator (d1) or any sensitizer.

TABLE 1

Formulation of the compositions and their properties (n.d. = not determined)

| Component | Examples according to the present invention wt[%] | | | | | | | | | Comparative examples wt[%] | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| (a2) | 31.4 | 31.5 | 44.6 | 20.6 | 34.9 | 32.7 | 31.4 | 26.7 | 24.1 | 44.3 | 62.7 | 31.2 | 60.1 | 27.3 |
| (a3) | | | | | | | | | 8.3 | | | | | |
| (c1-1) | 48.2 | 46.8 | 32 | 49.8 | 32.1 | 50.5 | 48.4 | 41.1 | 50.0 | 31.7 | 8.0 | | | |
| (c8) | | | | | | | | | | | | 48.1 | | 41.9 |
| (c7-1) | | 1.6 | 2.5 | | 2.5 | | | | | | 8.0 | | 8.0 | |
| (c7-2) | | | | | | | | | | 2.1 | | | | |
| (d1) | 0.8 | 0.8 | 0.8 | 0.8 | 0.8 | 0.8 | 0.8 | 0.7 | 0.8 | 0.8 | 0.8 | 0.8 | 0.8 | 0.8 |
| (f1) | | | | | | | | | 0.8 | | | | | |
| Total component A | 80.4 | 80.7 | 79.9 | 71.2 | 70.3 | 84 | 80.6 | 68.5 | 84 | 78.9 | 79.5 | 80.1 | 68.9 | 70 |
| (b1) | | | | 28.8 | 29.7 | | | | | | | | 31.1 | 30.0 |
| (b2) | 19.6 | 19.3 | 20.1 | | | 8 | 8.1 | | 8 | 21.1 | 20.5 | 19.9 | | |
| (b3) | | | | | | 1.6 | 1.6 | | 1.6 | | | | | |
| (b4) | | | | | | 6.4 | | | 6.4 | | | | | |
| (b5) | | | | | | | | 31.5 | | | | | | |
| (b6) | | | | | | | | 9.7 | | | | | | |
| Total component B | 19.6 | 19.3 | 20.1 | 28.8 | 29.7 | 16 | 19.4 | 31.5 | 16 | 21.1 | 20.5 | 19.9 | 31.1 | 30 |
| SEW | 2898 | 2098 | 2221 | 2805 | 2217 | 2766 | 2886 | 3399 | 2794 | 2255 | 1307 | 2965 | 1413 | 3403 |
| Percentage of hybrid compound in SEW | 100% | 70% | 51% | 100% | 51% | 100% | 100% | 100% | 100% | 51% | 7% | 100% | 0% | 100% |
| Visual assessment | | | | | | | | | | | | | | |
| non-irradiated | liquid | liquid | liquid | liquid | liquid | liquid | liquid | liquid | liquid | liquid | liquid | liquid | liquid | liquid |
| irradiated | solid | solid | solid | solid | solid | solid | solid | solid | solid | solid | solid | solid | solid | solid |
| Run-off distance [mm] | | | | | | | | | | | | | | |
| non-irradiated | 38 | 28 | 49 | 11 | 16 | 33 | 26 | 22 | 29 | 16 | 52 | 28 | 37 | 12 |
| irradiated | 0 | 0 | 0 | 0 | 0 | 0 | 0 | 0 | 0 | 0 | 0 | 38 | 0 | 0 |
| Processing time [min] | 38 | n.d. | 40 | 112 | n.d. | n.d. | n.d. | n.d. | n.d. | 35 | 52 | 14 | n.d. | 31 |
| Modulus of elasticity [MPa] | | | | | | | | | | | | | | |
| non-irradiated | 3400 | 3300 | 3300 | 2700 | 2600 | 3700 | 3600 | 2600 | 3700 | 3100 | 2900 | 3300 | 1000 | 2700 |
| irradiated | 3600 | 3600 | 3400 | 2900 | 3000 | 3800 | 3900 | 2900 | 3800 | 3200 | 3400 | 3300 | 2600 | 2700 |
| Elongation at break [%] | | | | | | | | | | | | | | |
| non-irradiated | 4.5 | 3.9 | 5.3 | 3.7 | 3.7 | 2.0 | 2.2 | 2.4 | 2.5 | 4.0 | 7.1 | 4.8 | 23.3 | 3.5 |
| irradiated | 3.7 | 3.6 | 3.6 | 2.4 | 4.1 | 1.9 | 2.3 | 2.7 | 2.7 | 2.7 | 4.2 | 3.4 | 4.4 | 3.4 | 4.2 |
| Glass transition temperature [° C.] | | | | | | | | | | | | | | |
| non-irradiated | 51 | 61 | 59 | 82 | 73 | 88 | 85 | 72 | 71 | 65 | 66 | 66 | 61 | 91 |
| irradiated | 56 | 66 | 62 | 88 | 85 | 95 | 93 | 78 | 75 | 65 | 66 | 66 | 80 | 89 |

The examples according to the present invention from Table 1 contain, as the radiation-curable component (c), the hybrid compound (c1) which carries both epoxy groups and methacrylate groups. The methacrylate groups of the hybrid compound are present in the examples according to the present invention in a proportion of at least 50%, based on the radiation-curable equivalent weight (SEW) of the composition.

All Examples 1 to 10 according to the present invention are characterized in that they can be fixed by irradiation. After irradiation, the compositions are haptically solid and show no softening in the run-off test. By contrast, the non-inventive Comparative Example 12 based on an acrylate-containing radiation-curable hybrid compound (c8) remains liquid after irradiation and softens in the run-off test. At the same time, due to the use of the hybrid compound (c8) with acrylate groups, the processing time of Comparative Example 12 is reduced by more than half when directly compared to a formulation that is otherwise analogous but based on compound (c1-1) (Example 1 according to the present invention).

Apart from the hybrid compound (c1), Example 10 according to the present invention additionally contains trimethylolpropane triacrylate (c7-2) as an additional radiation-curable compound. The additional radiation-curable compound (c7-2) is present in a proportion of less than 50%, based on the radiation-curable equivalent weight of the composition. Still, the composition shows no significant disadvantages with regard to the mechanical properties in the irradiated and non-irradiated areas and the processing time. As compared to Example 3 according to the present invention, in which the analogous methacrylate (c7-1) is used as the additional radiation-curable compound, the processing time is reduced by only 5 minutes.

Following the state of the art according to EP 0 245 559 B1, the composition of Comparative Example 14 contains a curing agent showing a slow addition reaction to the acrylate groups of the hybrid compound (c8). Although Comparative Example 14 can be fixed by irradiation, the processing time is already reduced by more than ⅔ as compared to Example 4 according to the present invention based on the methacrylate-containing hybrid compound (c1-1).

Examples 4 and 5 according to the present invention contain a curing agent (b1) based on a polyamidoimidazole. To improve the light-fixation strength, Example 5 additionally contains trimethylolpropane trimethylacrlyate (c7-1) as the additional radiation-curable compound. By contrast, Comparative Example 13 contains only trimethylolpropane trimethylacrlyate (c7-1) but not the hybrid compound (c1) as the additional radiation-curable compound. This leads to significant differences in the mechanical properties of the cured composition in the irradiated and non-irradiated areas. For example, elongation at break differs by almost 20%, and the modulus of elasticity by factor 2.6. The glass transition temperature is 19° C. lower in the non-irradiated composition.

Examples 1 to 3 according to the present invention contain, as the curing agent, a polyether diamine (b2). Example 1 according to the present invention contains, as the radiation-curable compound (c), only the hybrid compound (c1-1). Examples 2 and 3 according to the present invention additionally contain TMPTA (c7-1) up to a proportion of 49%, based on the total proportion of the radiation-curable groups (SEW) of component (c). Up to this concentration, the mechanical properties of the cured masses differ only slightly between the irradiated and non-irradiated zones.

In the composition of Comparative Example 11 only 7% of the radiation-curable methacrylate groups result from the hybrid compound (c1-1), based on the SEW of the composition. Although the composition can be light-fixed without restrictions, it shows, after curing, a relative difference of more than 50% in the mechanical properties, in particular with regard to elongation at break, between the irradiated and non-irradiated composition.

Examples 6, 7, 9 according to the present invention contain curing agent mixtures on the basis of polyether amines, cycloaliphatic amines and aromatic benzyl amines. In Example 7 according to the present invention. a curing agent (b6) obtained by partial reaction of a bisphenol A epoxy resin (Epikote Resin 828LVEL, (a4)) and MXDA (b4) (manufacturing example 5) was used.

Example 8 according to the present invention contains, as the curing agent, a commercially available mixture of MXDA (b4) and phenalkamines (b5).

The masses according to the present invention are characterized by a broad formulation range with regard to the curing agent without the mechanical properties of the cured masses such as glass transition temperature, modulus of elasticity and elongation at break significantly differing between the irradiated and non-irradiated areas of the composition. At the same time, the examples according to the present invention have variable processing times without the described properties being negatively affected.

The invention claimed is:

1. A curable two- or multi-part composition, comprising:
    (a) optionally an at least bifunctional epoxy-containing compound;
    (b) an at least bifunctional nitrogen-based curing agent suitable for epoxy curing selected from the group of primary and secondary amines, wherein the curing agent is present in liquid form at room temperature;
    (c) a radiation-curable compound comprising at least one hybrid compound (c1), wherein the at least one hybrid compound (el) has both one or more radiation-curable methacrylate groups and one or more epoxy groups, wherein the at least one hybrid compound (c1) is bifunctional or of a higher functionality with regard to the epoxy groups and/or the radiation-curable methacrylate groups,
    wherein an amount of substance of the radiation-curable methacrylate groups of the at least one hybrid compound (c1) is at least 50%, based on the radiation-curable equivalent weight (SEW) of the composition; and
    wherein the at least one hybrid compound (c1) can be obtained by reaction of a methacrylate-containing isocyanate or a methacrylate-containing silane with a hydroxy-functional epoxy compound;
    (d) a radical photoinitiator;
    (e) optionally an accelerator for epoxy curing; and
    (f) optionally further additives.

2. The composition according to claim 1, wherein the composition can be fixed by irradiation with actinic radiation.

3. The composition according to claim 1, wherein the composition, in addition to the radiation-curing hybrid compound (el), contains an additional radiation-curable compound.

4. The composition according to claim 3, wherein the additional radiation-curable compound is an additional radiation curable methacrylate compound.

5. The composition according to claim 1, wherein the composition further comprises:
    (a) the at least bifunctional epoxy-containing compound, and optionally a monofunctional epoxy compound as a reactive diluent;
    (b) the at least bifunctional nitrogen-based curing agent suitable for polyaddition to an epoxy compound; and (c) the radiation-curable compound comprising at least one radiation-curable hybrid compound (c1) carrying both one or more methacrylate groups and one or more epoxy groups, wherein the at least one hybrid compound (c1) is bifunctional or of a higher functionality with regard to the epoxy groups and/or the radiation-curable methacrylate groups, and wherein the at least one hybrid compound (c1) can be obtained by reaction of a methacrylate-containing isocyanate or a methacrylate-containing silane with a hydroxy-functional epoxy compound, and wherein the radiation-curable compound optionally comprises an additional radiation-curable compound (c7), wherein the amount of substance of the radiation-curable methacrylate groups of the hybrid compound is at least 50%, based on the radiation-curable equivalent weight (SEW) of the composition;

(d) an accelerator; and (e) further additives.

6. The composition according to claim 5, wherein the radiation-curable hybrid compound (c1) is a compound carrying both one or more methacrylate groups and two or more epoxy groups.

7. The composition according to claim 5, wherein the amount of substance of the radiation-curable methacrylate groups of the hybrid compound is 70 to 100%, based on the radiation-curable equivalent weight (SEW) of the composition.

8. The composition according to claim 1, wherein the composition further comprises, each based on the total weight of components a) to e):

(a) 10 to 65 weight percent of an at least bifunctional epoxy-containing compound, and 0 to 15 weight percent of a monofunctional epoxy compound as a reactive diluent;

(b) 5 to 90 weight percent of the at least bifunctional nitrogen-based curing agent suitable for polyaddition to an epoxy compound;

(c) 10 to 80 weight percent of the radiation-curable compound, wherein the radiation-curable compound comprises at least one hybrid compound (c1) carrying both one or more methacrylate groups and one or more epoxy groups, wherein the at least one hybrid compound (c1) is bifunctional or of a higher functionality with regard to the epoxy groups and/or the radiation-curable methacrylate groups, and wherein the at least one hybrid compound (c1) can be obtained by reaction of a methacrylate-containing isocyanate or a methacrylate-containing silane with a hydroxy-functional epoxy compound, and wherein the radiation-curable compound optionally comprises an additional radiation-curable compound (c7), wherein the amount of substance of the radiation-curable methacrylate groups of the hybrid compound is 50 to 100%, based on the radiation-curable equivalent weight (SEW) of the composition;

(d) 0.01 to 5 weight percent of a radical photoinitiator;

(e) 0.01 to 5 weight percent of an accelerator for epoxy curing; and (f) optionally further additives.

9. The composition according to claim 8, wherein the radiation-curable hybrid compound (c1) is a compound carrying both one or more methacrylate groups and two or more epoxy groups.

10. The two-part composition according to claim 1, further comprising:

a resin component (A) comprising 20 to 50 wt-% of a bisphenol A/F diglycidyl ether; 15 to 50 wt-% of the radiation-curable hybrid compound (el), 0.1 to 5 wt-% of a radical photoinitiator and 0 to 60 wt-% of further additives from the group of thixotropic agents, core-shell rubbers, inorganic fillers, stabilizers, adhesion promoters and combinations thereof, each based on the total composition of the resin component (A); and a curing agent component (B) comprising 10 to 100 wt-% of the at least bifunctional curing agent suitable for epoxy curing, and 0 to 90 wt-% of further additives from the group of thixotropic agents, core-shell rubbers, inorganic fillers, adhesion promoters, and combinations thereof, each based on the total weight of the curing agent component (B).

11. The composition according to claim 10, wherein the curing agent is based on amines selected from the group of (poly)ether amines and cycloaliphatic amines, and combinations thereof.

12. The composition according to claim 1, wherein the composition comprises a resin component (A) with an epoxy equivalent weight EEW and a curing agent component (B) with an active amine hydrogen equivalent weight AHEW, wherein a mixing ratio of the resin component (A) to the curing agent component (B) is in a range of 0.8 to 1.2, based on the EEW/AHEW ratio.

13. The composition according to claim 12, wherein the mixing ratio of the resin component (A) to the curing agent component (B) is in a range of 0.95 to 1.05, based on the EEW/AHEW ratio.

14. A method for the bonding, casting, molding or coating of substrates using the composition according to claim 1, comprising the following steps:

a) mixing the resin component (A) with the curing agent component (B);

b) dosing the composition onto a first substrate;

c) optionally supplying a second substrate to form a substrate composite, wherein the second substrate is brought into contact with the composition and optionally one of the two substrates is aligned relative to the other;

d) irradiating the composition with actinic radiation, whereby the irradiated composition achieves a fixation strength that is sufficient for further processing of the first substrate or the substrate composite; and e) optionally maintaining a waiting time at room temperature until the composition is cured, or heating the irradiated composition on the substrate or in the substrate composite to reduce the waiting time or until curing.

15. The composition according to claim 1, wherein the composition is configured to be used for at least one of a fabrication of electric motors or a manufacture of optoelectronic structures.

16. A curable two- or multi-part composition, comprising:

(a) optionally an at least bifunctional epoxy-containing compound;

(b) an at least bifunctional nitrogen-based curing agent suitable for epoxy curing selected from the group of primary and secondary amines, wherein the curing agent is present in liquid form at room temperature;

(c) at least one radiation-curable compound, with the exception of an urethane (meth)acrylate oligomer, wherein the radiation curable compound comprises at least one hybrid compound (c1), wherein the at least one hybrid compound (el) has both one or more radiation-curable methacrylate groups and one or more epoxy groups, wherein the at least one hybrid compound (c1) is bifunctional or of a higher functionality with regard to the epoxy groups and/or the radiation-curable methacrylate groups;

wherein an amount of substance of the radiation-curable methacrylate groups of the at least one hybrid compound (el) is at least 50%, based on the radiation-curable equivalent weight (SEW) of the composition; and wherein the at least one hybrid compound (c1) can be obtained by reaction of a methacrylate-containing isocyanate or a methacrylate-containing silane with a hydroxy-functional epoxy compound;

(d) a radical photoinitiator;
(e) optionally an accelerator for epoxy curing; and
(f) optionally further additives.

17. A curable two- or multi-part composition, comprising:
(a) optionally an at least bifunctional epoxy-containing compound;
(b) an at least bifunctional nitrogen-based curing agent suitable for epoxy curing selected from the group of primary and secondary amines, wherein the curing agent is present in liquid form at room temperature;
(c) at least one radiation-curable compound, wherein the at least one radiation-curable compound is a radiation-curable hybrid compound (c1) carrying both one or more methacrylate groups and one or more epoxy groups, optionally in combination with an additional radiation-curable methacrylate compound (c7) selected from the group consisting of 1,4-butanediol dimethacrylate, bisphenol A glycidyl methacrylate and trimethylolpropane trimethacrylate, wherein the at least one hybrid compound (c1) is bifunctional or of a higher functionality with regard to the epoxy groups and/or the radiation-curable methacrylate groups;

wherein an amount of substance of the radiation-curable methacrylate groups of the at least one hybrid compound (c1) is at least 50%, based on the radiation-curable equivalent weight (SEW) of the composition; and wherein the at least one hybrid compound (c1) can be obtained by reaction of a methacrylate-containing isocyanate or a methacrylate-containing silane with a hydroxy-functional epoxy compound;

(d) a radical photoinitiator;
(e) optionally an accelerator for epoxy curing; and
(f) optionally further additives.

* * * * *